United States Patent
Pike et al.

(10) Patent No.: US 6,352,948 B1
(45) Date of Patent: Mar. 5, 2002

(54) FINE FIBER COMPOSITE WEB LAMINATES

(75) Inventors: Richard Daniel Pike, Norcross; Henry Louis Griesbach, III, Atlanta, both of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 08/994,532

(22) Filed: Dec. 19, 1997

Related U.S. Application Data

(63) Continuation-in-part of application No. 08/565,261, filed on Nov. 30, 1995, now Pat. No. 5,759,926, which is a continuation of application No. 08/484,365, filed on Jun. 7, 1995, now abandoned.

(51) Int. Cl.[7] .................................... B32B 5/06
(52) U.S. Cl. ..................... 442/384; 442/361; 442/382; 442/394; 442/400; 442/401
(58) Field of Search .......................... 428/317.9, 318.4; 442/361, 382, 384, 394, 401, 400, 389

(56) References Cited

U.S. PATENT DOCUMENTS

| | | | |
|---|---|---|---|
| 3,485,706 A | 12/1969 | Evans | 19/161 |
| 3,641,760 A | 2/1972 | Keuchel | 57/157 |
| 3,751,777 A | 8/1973 | Turmel et al. | 28/72 |
| 3,873,255 A | 3/1975 | Kalwaites | |

(List continued on next page.)

FOREIGN PATENT DOCUMENTS

| | | |
|---|---|---|
| EP | 0694644 B1 | 11/1999 |
| WO | 96/41041 | 12/1996 |
| WO | 97/46750 | 12/1997 |
| WO | 98/03710 | 1/1998 |
| WO | 98/09010 | 3/1998 |

OTHER PUBLICATIONS

Japanese Derwent Abstract 6073613A, Mar. 15, 1994.
Patent Abstracts of Japan, 08–260247, Oct. 8, 1996.
Patent Abstracts of Japan, 08–127921, May 21, 1996.
Patent Abstracts of Japan, 06–330449, Nov. 29, 1994.
Patent Abstracts of Japan, 02–169722, Jun. 29, 1990.
Japanese Abstract, 404263679A, Sep. 18, 1992.
Japanese Abstract, 404126840A, Apr. 27, 1992.
Nonwovens Industry, Spunlaced Nonwovens, July 1987, pp. 32–36.
Lu, Fumin, New Technology For Microdenier Spunbonds, Spring 1996, pp. 36–40.

*Primary Examiner*—Christopher Raimund
(74) *Attorney, Agent, or Firm*—Douglas M. Tulley, Jr.

(57) ABSTRACT

A multilayer laminate comprising a fine fiber nonwoven composite web which is a mixture of a first group of fibers and a second group of fibers such that the first and second fibers comprise polymers that are incompatible with each other. The fine fiber nonwoven composite web is bonded to a barrier layer such as a microporous film or a nonwoven web of meltblown fibers.

32 Claims, 4 Drawing Sheets

U.S. PATENT DOCUMENTS

| | | | | |
|---|---|---|---|---|
| 3,895,151 | A | 7/1975 | Matthews et al. | 428/102 |
| 3,917,784 | A | 11/1975 | Nishida | 264/103 |
| 3,940,302 | A | 2/1976 | Matthews et al. | 156/167 |
| 3,966,865 | A | 6/1976 | Nishida et al. | |
| 4,051,287 | A | 9/1977 | Hayashi et al. | 428/91 |
| 4,118,534 | A | 10/1978 | Stanley | 428/370 |
| 4,233,355 | A | 11/1980 | Sato et al. | |
| 4,239,720 | A | 12/1980 | Gerlach et al. | |
| 4,241,122 | A | 12/1980 | Asano | 428/90 |
| 4,298,649 | A | 11/1981 | Meitner | 428/198 |
| 4,352,705 | A | 10/1982 | Ozaki et al. | |
| 4,361,609 | A | 11/1982 | Gerlach et al. | |
| 4,369,156 | A | 1/1983 | Mathes et al. | |
| 4,379,192 | A | 4/1983 | Wahlquist et al. | 428/156 |
| 4,381,335 | A | 4/1983 | Okamoto | |
| 4,434,530 | A | 3/1984 | Miessen et al. | 19/46 |
| 4,460,649 | A | 7/1984 | Park et al. | |
| 4,476,186 | A | 10/1984 | Kato et al. | |
| 4,522,203 | A | 6/1985 | Mays | 128/132 |
| 4,560,385 | A | 12/1985 | Baravian | |
| 4,657,804 | A | 4/1987 | Mays et al. | |
| 4,764,325 | A | 8/1988 | Angstadt | 264/113 |
| 4,840,846 | A | 6/1989 | Ejima et al. | 428/373 |
| 4,923,454 | A | 5/1990 | Seymour et al. | |
| 4,966,808 | A | 10/1990 | Kawano | |
| 5,023,130 | A | 6/1991 | Simpson et al. | 428/227 |
| 5,047,189 | A | 10/1991 | Lin | |
| 5,302,421 | A | 4/1994 | Hoessel et al. | 427/552 |
| 5,355,565 | A | 10/1994 | Baravian | |
| 5,405,698 | A | 4/1995 | Dugan | |
| 5,466,516 | A | 11/1995 | Lutzow et al. | 428/282 |
| 5,503,907 | A | 4/1996 | Gessner et al. | 428/198 |
| 5,505,894 | A | 4/1996 | Frankfort et al. | 264/172 |
| 5,554,437 | A | 9/1996 | Gupta et al. | 428/286 |
| 5,645,936 | A | 7/1997 | Frankfort et al. | 428/395 |
| 4,041,203 | A | 8/1997 | Brock et al. | 428/157 |
| 5,718,972 | A | 2/1998 | Murase et al. | 428/360 |
| 5,759,926 | A | 6/1998 | Pike et al. | |
| 5,783,503 | A | 7/1998 | Gillespie et al. | 442/340 |
| 5,795,651 | A | 8/1998 | Matsuoka et al. | 428/364 |
| 5,885,909 | A | 3/1999 | Rudisill et al. | |
| 5,895,710 | A | 4/1999 | Sasse et al. | |
| 5,993,943 | A | 11/1999 | Bodaghi et al. | |
| 6,004,673 | A | 12/1999 | Nishijima | |
| 6,100,208 | A * | 8/2000 | Brown et al. | 442/364 |
| 6,200,669 | B1 | 3/2001 | Marmon et al. | |
| 6,286,145 | B1 * | 9/2001 | Welchel et al. | 2/69 |

\* cited by examiner

FINE FIBER COMPOSITE WEB LAMINATES

RELATED APPLICATIONS

This is a continuation-in-part application of U.S. patent application Ser. No. 08/565,261 filed Nov. 30, 1995, now U.S. Pat. No. 5,759,926 which is itself a continuation of U.S. application Ser. No. 08/484,365 filed Jun. 7, 1995 abandoned. The entire contents of the aforesaid applications are incorporated herein by reference.

FIELD OF THE INVENTION

The present invention relates to nonwoven web laminates. More particularly, the present invention relates to fine fiber composite web laminates.

BACKGROUND OF THE INVENTION

Nonwoven fabrics have been employed in a wide variety of products and/or as components of products, such as, for example, in personal care articles, infection control products, industrial protective apparel as well as various cleaning products. Staple articles which commonly employ nonwoven laminates include baby wipes, disposable diapers, adult incontinence garments, feminine hygiene products, surgical gowns, surgical drapes, sterilization wraps, as well as, numerous other articles of commerce. Many of the aforesaid articles or nonwoven components thereof are handled and/or worn by persons and thus the tactile qualities or softness (i.e. "hand") of the nonwoven laminate is desirably one pleasing to the touch. Nonwoven fabrics desirably have a feel and drape which resembles that of cloth or other apparel quality fabrics. Having attributes similar to that of cloth allows an article employing the nonwoven fabrics to have characteristics which are preferred by consumers as they are more comfortable to handle and/or wear.

In addition to the tactile attributes, nonwoven fabrics are often employed in articles in which reliability and durability is also a significant concern. For example, laminates of spunbond fiber webs and films have been employed as outer covers in disposable diapers as well as in infection control products, e.g. surgical gowns. In such instances the film laminate often acts to control the flow of fluids such as, for example, to contain bodily exudates in the case of a diaper or to prevent penetration of blood in the case of a surgical gown. Loss of the barrier properties in the laminate may result from defects or macroscopic holes within the film such as tears, rips, pin-holes, etc. Defects in the film may result from the strain and/or abrasion experienced in converting and/or use of the laminate. With many film laminates, a relatively thin film is used and bonding of the film to a nonwoven provides additional strength and integrity to the film. Thus, the resulting film laminate can exhibit both barrier properties and good strength. Therefore, film laminates desirably employ nonwovens which are capable of forming good bonds to the film or other barrier layer and yet which also provide excellent hand, strength and/or abrasion resistance to the laminate.

Thus, there exists a continuing need for nonwoven laminates and particularly film/nonwoven laminates which have improved hand, drape and/or other tactile qualities. Further, there exists a need for such laminates which provide improved strength, abrasion resistance and overall durability.

SUMMARY OF THE INVENTION

Figure 1:
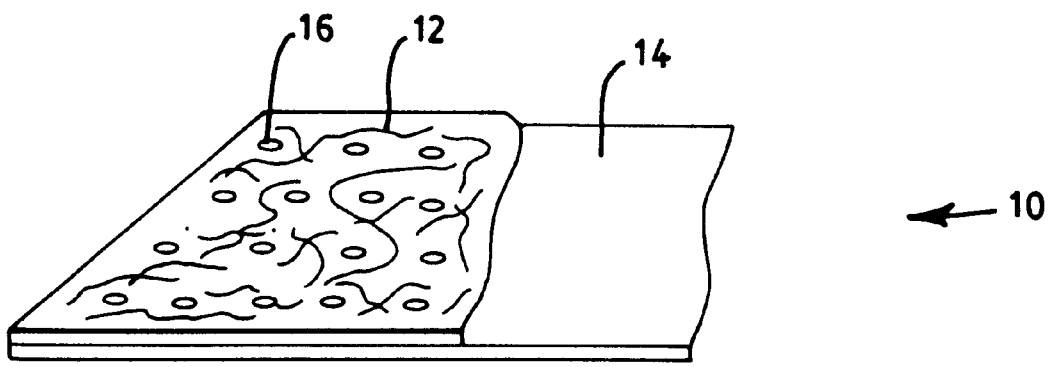
FIG. 1 is a partially cut-away view of a composite nonwoven laminate of the present invention.

The aforesaid needs are fulfilled and the problems experienced by those skilled in the art overcome by a barrier laminate of the present invention which comprises a fine fiber composite nonwoven web and a barrier layer. The fine fiber composite nonwoven web comprises first and second fibers wherein at least the first fibers have an average fiber thickness less than about 1 denier. The fine fiber composite web comprises a mixture of first fibers comprising a first polymer and second fibers comprising a second polymer, wherein the first and second polymers are immiscible with one another. The barrier layer has a hydrohead of at least about 30 mbar and is integrally attached to the fine fiber composite nonwoven web to form a cohesive multilayer laminate. Desirably, the first fibers of the fine fiber composite web have a denier less than about 0.9 denier and even more desirably both the first and second fibers have a denier between about 0.025 and 0.9 denier.

In a further aspect of the invention, the fine fiber composite nonwoven web comprises a hydroentangled web. In still a further aspect the fine fiber composite can have an average fiber diameter such that both the first and second fibers are between about 0.025 and about 0.5 denier. In a further aspect the barrier layer can comprise a microporous film such as, for example, a filled polyolefin film having a basis weight of less than about 35 g/m². Preferably the microporous film comprises a polyolefin film and one of the first or second fibers comprise a similar compatible polymer composition. As examples, the barrier layer can comprise a polyethylene film and the first and second fibers can comprise the following polymers respectively: ethylene and polyethylene terephthalate or amide (e.g. nylon) and ethylene.

DEFINITIONS

As used herein the term "nonwoven fabric" or "nonwoven web" means a web having a structure of individual fibers or threads which are interlaid, but not in an identifiable manner as in a woven or knitted fabric. Nonwoven fabrics or webs have been formed from many processes such as for example, meltblowing processes, spunbonding processes, hydroentangling, air-laid and bonded carded web processes.

As used herein the term "denier" refers to a commonly used expression of fiber thickness which is defined as grams per 9000 meters. A lower denier indicates a finer fiber and a higher denier indicates a thicker or heavier fiber.

As used herein the term "spunbonded fibers" or "spunbond fibers" refers to small diameter fibers of molecularly oriented polymeric material. Spunbond fibers can be formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., U.S. Pat. No. 3,802,817 to Matsuki et al., U.S. Pat. No. 3,502,763 to Hartman; U.S. Pat. No. 3,692,618 Dorschner et al., U.S. Pat. No. 3,542,615 to Dobo et al. and U.S. Pat. No. 5,382,400 to Pike et al.; the entire contents of which are incorporated herein by reference. Spunbond fibers are generally not tacky when they are deposited onto a collecting surface.

As used herein the term "meltblown fibers" means fibers of polymeric material which are generally formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin et al. Meltblown fibers are microfibers which may be continuous or discontinuous, are generally smaller than about 10 microns in average diameter, and are generally tacky when deposited onto a collecting surface. In addition, meltblown fibers typically comprise low molecular oriented polymer relative to fibers produced by other means, such as drawing, and also a low tenacity relative to the same.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible spatial configurations of the molecule. These configurations include, but are not limited to isotactic, syndiotactic and random symmetries.

As used herein the term "monocomponent" fiber refers to a fiber formed from one or more extruders using only one polymer. This is not meant to exclude fibers formed from one polymer to which small amounts of additives have been added for coloration, anti-static properties, lubrication, hydrophilicity, etc.

As used herein the term "multicomponent fibers" refers to fibers which have been formed from at least two polymers extruded from separate extruders but spun together to form one fiber. Multicomponent fibers include fibers commonly referred to as conjugate or bicomponent fibers. The polymers are arranged in substantially constantly positioned distinct zones across the cross-section of the fibers and extend continuously along the length of the fibers. The configuration of such a multicomponent fiber may be, for example, a side by side arrangement, a pie arrangement or other non-occlusive configurations. Multicomponent fibers and/or methods of making the same are taught in U.S. Pat. No. 5,108,820 to Kaneko et al.; U.S. Pat. No. 4,795,668 to Krueger et al.; U.S. Pat. No. 5,336,552 to Strack et al. and U.S. patent application Ser. No. 081550,042 filed Oct. 30, 1996 to Cook. Multicomponent fibers are also taught in U.S. Pat. No. 5,382,400 to Pike et al. and can be used to produce crimp in the fibers by using the differential rates of expansion and contraction of the two or more polymers. For two component fibers, the polymers may be present in ratios of 75/25, 50/50, 25/75 or any other desired ratios. The fibers may also have shapes such as those described in U.S. Pat. No. 5,277,976 to Hogle et al., U.S. Pat. No. 5,466,410 to Hills and U.S. Pat. Nos. 5,069,970 and 5,057,368 to Largman et al., which describe fibers with unconventional shapes.

As used herein the term "biconstituent fibers" refers to fibers which have been formed from at least two polymers extruded from the same extruder as a blend. Biconstituent fibers do not have the various polymer components arranged in relatively constantly positioned distinct zones across the cross-sectional area of the fiber and the various polymers are not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. No. 5,108,827 and 5,294,482 to Gessner.

As used herein the term "blend" means a mixture of two or more polymers while the term "alloy" means a sub-class of blends wherein the components are immiscible but have been compatibilized. Further, "compatibilization" is defined as the process of modifying the interfacial properties of an immiscible polymer blend in order to make an alloy.

As used herein the term "composite nonwoven web" refers to a mixture of at least first and second fibers throughout the web wherein the polymeric composition of the first fibers differ from the polymeric composition of the second fibers.

As used herein, through-air bonding means a process of bonding a nonwoven bicomponent fiber web in which air which is sufficiently hot to melt one of the polymers of which the fibers of the web are made is forced through the web. The melting and resolidification of the polymer provides the bonding. Through air bonding typically requires the melting of at least one component to accomplish bonding. In the through-air bonder, air having a temperature above the melting temperature of one component and below the melting temperature of another component can be directed from a surrounding hood, through the web, and into a perforated roller supporting the web. Alternatively, the through-air bonder may be a flat arrangement wherein the air is directed vertically downward onto the web. The hot air melts the lower melting polymer component and thereby forms bonds at fiber contact points to provide increased integrity to the web.

As used herein the term "hot air knife" means a process of pre- or preliminarily bonding a just produced microfiber, particularly spunbond, web in order to give it sufficient integrity, i.e. increase the stiffness of the web, for further processing, but does not mean the relatively strong bonding of secondary bonding processes like through-air bonding, thermal bonding and ultrasonic bonding. A hot air knife is a device which focuses a stream of heated air at a very high flow rate. The air temperature is usually in the range of the melting point of at least one of the polymers used in the web. The time of exposure of any particular part of the web to the air discharged from the hot air knife is less than about a tenth of a second and generally about a hundredth of a second in contrast with the through air bonding process which has a much larger dwell time. The process has a great range of variability and controllability of many factors such as air temperature, velocity, pressure, volume, slot or hole arrangement and size, and the distance from the plenum to the web. The process is further described in U.S. patent application Ser. No. 08/362,328 to Arnold et al., filed Dec, 22, 1994 and commonly assigned.

As used herein, "ultrasonic bonding" means a process performed, for example, by passing the fabric between a sonic horn and anvil roll as illustrated in U.S. Pat. No. 4,374,888 to Bornslaeger.

As used herein "point bonding" means bonding one or more fabrics with a plurality of spaced bond points. For example, thermal point bonding generally involves passing a fabric or web of fibers to be bonded into a nip formed between heated rolls such as, for example, a calender roll and an anvil roll. The calender roll is usually, though not always, patterned in some way so that the entire fabric is not bonded across its entire surface, and the anvil roll is usually smooth. As a result, various patterns for calender rolls have been developed for functional as well as aesthetic reasons. One example of a pattern has points and is the Hansen Pennings or "H&P" pattern with about 10%–25% bond area with about 200 bonds/square inch as taught in U.S. Pat. No. 3,855,046 to Hansen and Pennings, the entire contents of which are incorporated herein by reference. Other common patterns include a diamond pattern with repeating and slightly offset diamonds with about a 16% bond area and a wire weave pattern looking as the name suggests, e.g. like a window screen, with about a 19% bond area. Desirably, the percent bonding area varies from about 10% to about 30% of the area of the fabric laminate web. The point bonding imparts integrity to individual layers by bonding fibers within the layer and/or for laminates, point bonding holds the layers together to form a cohesive laminate.

As used herein, the term "barrier fabric" means a fabric which is relatively impermeable to the transmission of liquids, i.e., a fabric which has a hydrohead of at least about 30 mbar.

As used herein, the term "breathability" refers to the water vapor transmission rate (WVTR) of an area of fabric which is measured in grams of water per square meter per day (g/m$^2$/24 hours). WVTR can be measured as indicated below.

As used herein, the term "garment" means any type of non-medically oriented apparel which may be worn. This includes industrial work wear and coveralls, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like.

As used herein, the term "personal care product" means diapers, training pants, absorbent underpants, adult incontinence products, and feminine hygiene products.

As used herein, the term "protective fabric" means a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as a fabric which is primarily, though not exclusively, used outdoors such as, for example, tarpaulins, awnings, canopies, tents, agricultural fabrics and outdoor apparel such as head coverings, industrial work wear and coveralls, pants, shirts, jackets, gloves, socks, shoe coverings, and the like.

As used herein the term "hydroentangling" means passing the nonwoven fabric, when supported on a foraminous substrate, under an array of liquid jets, typically arranged in a linear fashion to span the width of the fabric, such that columnar jets of water strike the nonwoven fabric having sufficient impact to have a measurable effect on the nonwoven fabric (e.g. rearrangement of fibers, fiber splitting, etc.).

As used herein, the term "impact energy" refers to the energy imparted to the fabric by the hydroentangling apparatus and is calculated as: $E=0.125(YPG/sb)$ where Y is the number of orifices per linear inch; P is the pressure of the liquid in the manifold in p.s.i.g.; G is the volumetric flow in cubic feet/minute/orifice; s is the speed of passage of the web under the streams; and b is the weight of fabric produced in osy (ounces per square yard). A more detailed discussion of the impact energies and energy flux associated with hydroentangling nonwoven webs can be found in U.S. Pat. No. 3,485,706 issued to Evans, the entire contents of which are incorporated herein by reference.

As used herein "impact-energy product" means the energy used to hydroentangle a fabric, measured in Megajoule-Newton per kilogram (MJ-N/Kg) and as calculated as disclosed in U.S. Pat. No. 5,023,130 to Simpson et al., the entire contents of which are incorporated herein by reference.

DESCRIPTION OF THE PREFERRED EMBODIMENTS

Referring to FIG. 1, a nonwoven laminate 10 comprises a fine fiber composite nonwoven web 12 and a barrier layer 14. The fine fiber composite nonwoven web 12 comprises a mixture of at least first fibers and second fibers of immiscible polymeric components. Additional layers can be disposed between the fine fiber composite nonwoven web and barrier layer and/or attached to either the barrier layer 14 or fine fiber composite fabric 12 as desired and bonded together so as to form a cohesive multilayer laminate.

The fine fiber composite nonwoven webs desirably comprise at least first and second fibers having an average fiber cross-sectional area of less than about 125 $\mu^2$, desirably having an average fiber diameter of between about 3 $\mu^2$ and about 110 $\mu^2$, and even more desirably between about 12 $\mu^2$ and about 60$\mu^2$. In a further aspect, the fine fiber composite nonwoven web comprise first fibers having an average denier less than about 1.0 and desirably between about 0.025 denier to 0.9 denier and even more desirably between about 0.1 denier and 0.5 denier. Still more desirably, both the first and second fibers have deniers within the aforesaid denier ranges. Additionally, the fine fiber composite webs preferably have a basis weight between 5 g/m$^2$ and 340 g/m$^2$ and even more preferably, between about 15 g/m$^2$ and 68 g/m$^2$. Fine fiber composite webs having the desired tenacity and hand may be formed by extruding molten thermoplastic materials as integrally formed continuous filaments through a plurality of capillaries of a spinneret with the diameter of the extruded filaments then being rapidly reduced as by, for example, in spunbonded processes. In one aspect, multicomponent spunbond fibers comprising individual components of incompatible polymers may be made and thereafter acted upon to lengthwise split the individual components apart, forming a web which comprises a mixture of first fibers of a first polymeric material and of second fibers of a second polymeric material. Desirably the fine fiber composite web comprises substantially continuous fibers or filaments. Thus, the web can comprise lengths of unsplit multicomponent fibers and lengths of fibers of the respective polymer components. Exemplary methods of making such fine fiber composite webs include, but are not limited to, those described in U.S. patent application Ser. No. 08/565,261 to Pike et al. filed Nov. 30, 1995 and U.S. patent application Ser. No. 08/756,426 to Marmon et al. filed Nov. 26, 1996; the entire contents of the aforesaid applications are incorporated herein by reference.

Figure 3:
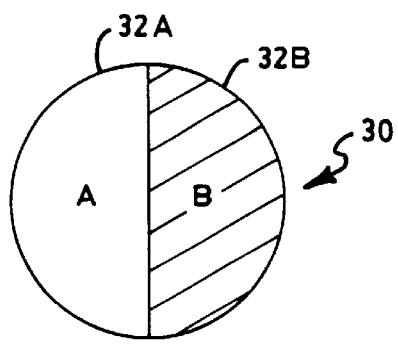
FIGS. 3–7 are cross-sectional views of exemplary multicomponent fibers suitable for use with the present invention.
Figure 4:
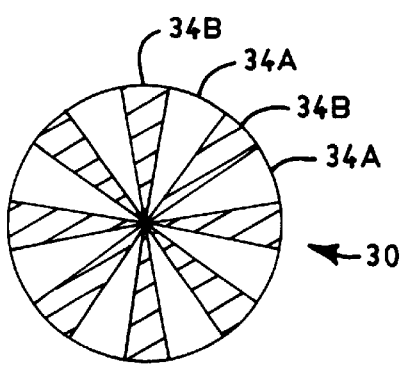

Multicomponent fibers most useful for fabricating fine fiber composite webs generally comprise individual segments or components that are substantially contiguous along the length of the multicomponent fiber in a manner such that a plurality of the components or segments form part of the outer surface of the multicomponent fiber. For example, in reference to FIG. 3, a unitary multicomponent fiber 30 is shown, having a side-by-side configuration, with a first segment or component 32A forming part of the outer surface of the multicomponent fiber 30 and a second segment or component 32B forming the remainder of the outer surface of the multicomponent fiber 30. A particularly useful configuration, as shown in FIG. 4, is a plurality of radially extending wedge-like shapes 34A and 34B, which in reference to the cross-section of the segments, are thicker at the outer surface of the multicomponent fiber 30 than at the inner portion of the multicomponent fiber 30. In one aspect, the multicomponent fiber 30 may have a series of individual wedge-shaped segments or components 34A and 34B of alternating polymeric materials.

Figure 7:
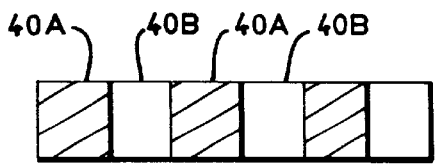
Figure 6:
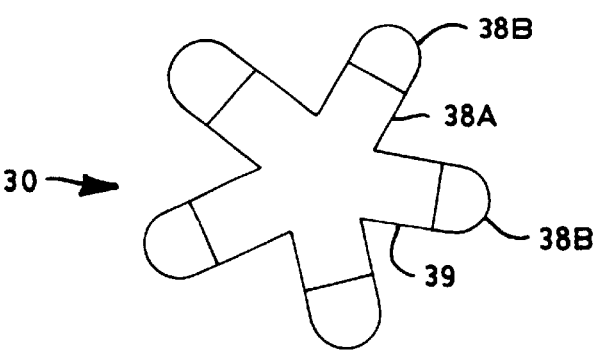
Figure 5:
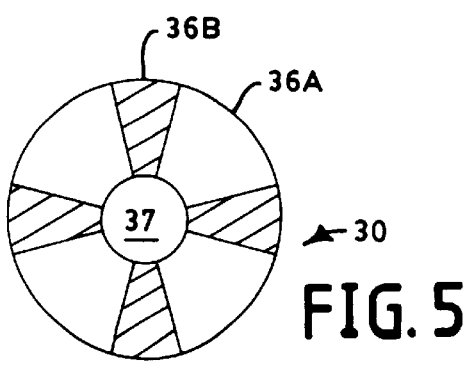

In addition to circular fiber configurations, the multicomponent fibers may comprise various shapes, such as square, multilobal, ribbon and/or other shapes. Additionally, in reference to FIG. 5, multicomponent fibers may be employed, having alternating segments 36A and 36B about a hollow center 37. In a further aspect, as shown in FIG. 6, a multicomponent fiber 30 suitable for use with the present invention may comprise individual components 38A and 38B wherein a first segment 38A comprises a contiguous filament with radially extending arms and/or lobes 39 that separate a plurality of additional outer segments 38B. In a further aspect and in reference to FIG. 7, alternating segments 40A and 40B form ribbon-shaped multicomponent fiber 30 having substantially parallel segments extending across the fiber cross-section.

The individual segments, although of varied shape, preferably have distinct boundaries or zones across the cross-section of the fiber. It is preferred that the shapes are well defined or "distinct" in the that they do not occlude or overlap adjacent segments along the outer surface of the multicomponent fiber. This overlap will often impede and/or prevent separation of the individual segments, particularly where one segment is fully engulfed by one or more other segments. Thus, "wrap around" is therefore preferably avoided and the formation of well defined or distinct shapes highly desirable. In a further aspect, it is desirable that the cross-sectional configuration of the multicomponent fiber is such that components or segments of identical or miscible polymers either have minimal or avoid all contact with one another.

In addition, in order to achieve a high degree of splitting the respective polymers forming the multicomponent fibers are preferably "incompatible polymers" with respect to one another, which as used herein indicates the polymers do not form a miscible blend when melt blended, i.e. the respective polymers are immiscible. As a desirable embodiment of the present invention, differences in the polymer solubility parameter ($\delta$) are used to select suitably incompatible polymers. The polymer solubility parameters ($\delta$) of different polymers are well known in the art. A discussion of the solubility parameter is, for example, disclosed in *Polymer: Chemistry and Physics of Modern Materials*, pages 142–145, by JMG Cowie, International Textbook Co., Ltd., 1973. Desirably, the adjacently disposed component polymers of the present multicomponent fibers have a difference in the solubility parameter of at least about 0.5 $(cal/cm^3)^{1/2}$, more desirably at least about 1 $(cal/cm^3)^{1/2}$, most desirably at least about 2 $(cal/cm^3)^{1/2}$. The upper limit of the solubility parameter difference is not critical for the present invention since the higher the difference, the more spontaneous the splitting of the fiber becomes.

Illustrative examples of particularly desirable pairs of incompatible polymers useful for the present multicomponent fibers will often vary with the splitting treatment used to form the fine fiber composite web. However, exemplary pairs of incompatible polymers include, but are not limited to, polyolefin-polyamide, e.g., polyethylene-nylon 6, polyethylene-nylon 6/6, polypropylene-nylon 6, polypropylene-nylon 6/6, polyethylene-a copolymer of caprolactam and alkylene oxide diamine, and polypropylene -a copolymer of caprolactam and alkylene oxide diamine; polyolefin-polyester, e.g., polyethylene-polyethylene terephthalate, polypropylene-polyethylene terephthalate, polyethylene-polybutylene terephthalate, polyethylene-PETG (which is polyethylene terephthalate modified with cyclohexanedimethanol), and polypropylene-polybutylene terephthalate; and polyamide-polyester, e.g., nylon 6-polyethylene terephthalate, nylon 6/6-polyethylene terephthalate, nylon 6-polybutylene terephthalate, nylon 6/6-polybutylene terephthalate, polyethylene terephthalate-a copolymer of caprolactam and alkylene oxide diamine, and polybutylene terephthalate-a copolymer of caprolactam and alkylene oxide diamine.

In addition to consideration of fiber separation, the polymers comprising the nonwoven web may be selected in accord with additional considerations. For example, infection control products such as surgical gowns and drapes, often undergo one or more sterilization processes. In this regard, certain polymers experience degradation or other deleterious effects as a result of such treatment. Notably, irradiation treatment of polypropylene causes partial degradation of the polymer which results in an unpleasant odor as well as a weakening of the fabric. Thus, polymer combinations such as polyesters, polyethylenes and nylons may be highly desirable in those applications where the article is expected to undergo irradiation for disinfection or sterilization purposes.

The fine fiber nonwoven composite web can be bonded to a barrier layer 14. A wide variety of barrier layers are known in the art such as meltblown fiber webs, fluid impervious films and the like. The barrier layer has a hydrohead in excess of about 30 mbar and desirably has a hydrohead in excess of about 50 mbar and still more desirably a hydrohead in excess of about 100 mbar. In addition, the barrier layer also desirably exhibits breathability (i.e. WVTR) in excess of 300 g/m²/day and even more desirably in excess of 800 g/m²/day and still more desirably in excess of 2000 g/m²/day. Examples of suitable meltblown fiber webs are described in commonly assigned U.S. Pat. No. 4,041,203 issued to Brock et al., U.S. Pat. No. 5,213,881 to Timmons et al. and U.S. Pat. No. 5,695,849 to Shawver et al., the entire contents of the aforesaid patents are incorporated herein by reference. Meltblown barrier fabrics desirably have basis weights of at least 7 g/m² and desirably have a basis weight between about 10 g/m² and 68 g/m². Examples of suitable films include, but are not limited to, films such as those described in WO 95/16562 filed Jun. 22, 1995 to McCormack; WO 96/19346 filed Jun. 27, 1996 to McCormack et al.; U.S. patent application Ser. No. 08/722,726 filed Oct. 1, 1996 to McCormack et al.; U.S. patent application Ser. No. 08/883,164 filed Jun. 26, 1997 to McCormack et al.; U.S. patent application Ser. No. 08/843,147 filed Apr. 25, 1997 to Gwaltney et al; and U.S. patent application Ser. No. 08/929,562 filed Sep. 15,1997 to McCormack et al; U.S. Pat. No. 4,777,073 to Sheth; U.S. Pat. No. 4,867,881 to Kinzer; the entire content of the aforesaid references are incorporated herein by reference. Desirably, the films comprise a breathable microporous film comprising a polyolefin polymer and a filler. In order to obtain good drape and handling properties the film desirably has a basis weight less than about 35 g/m² and even more desirably a basis weight between about 15 and 25 g/m². The barrier layer can itself comprise a combination of one or more materials.

The fine fiber composite nonwoven web and barrier layer can be combined to form a laminate by one or more means known in the art such as, for example, by thermally, ultrasonically, mechanically and/or adhesively attaching the layers to create a laminate. In one embodiment the layers of the laminate may be point bonded by thermal point bonding or ultrasonic bonding; as an example and in reference to FIG. 1, fine fiber composite web 12 and barrier layer 14 are bonded by point bonds 16. Desirably the bonding patterns employ a bond area between about 5% and 50% of the surface area of the fabric and even more desirably between about 10% and 30% of the surface area of the fabric. In order to enhance bonding between the layers of the laminate, it may be desirable to add bonding agents to one or more polymer formulations and/or employ one or more tie layers between the fine fiber composite nonwoven web and the barrier layer. Thermal bonding of the fine fiber composite nonwoven web may be preferred in applications where the mixture of different fibers employs polymers having different melting points and/or one or more polymers miscible with that of the barrier layer. This can improve the strength and durability of the bond points as well as the integrity of the overall laminate. In addition, the layers of the laminate can be adhesively bonded together by applying an adhesive between the layers. Suitable adhesives include, but are not limited to, pressure sensitive adhesives and hot melt adhesives, examples being Elmer's® spray adhesive from Borderline, Rextac 2730 amorphous polyalphaolefin from Huntsman Corporation, and H.B. Fuller's 5610 construction adhesive from Huntsman Corporation. Further, in order to maintain improved drape it may often be desirable to apply the adhesive in a pattern as opposed to application across the entire surface of one or more layers of the laminate.

Figure 2:
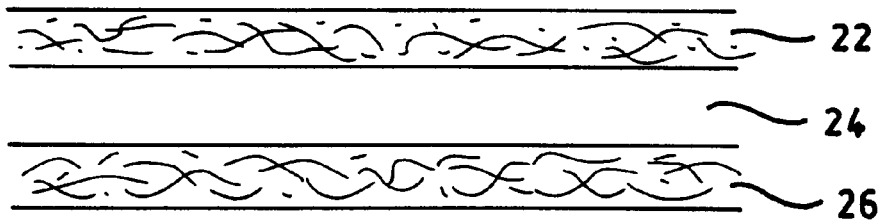
FIG. 2 is a cross-sectional view of a multilayer nonwoven laminate of the present invention.

In addition, additional layers can also be laminated with the fine fiber composite web and barrier layer. As an example, in reference to FIG. 2, a three layered laminate may be formed comprising a first fine fiber composite nonwoven web 22 and a second nonwoven web 26 bonded wherein the two nonwoven layers are bonded on opposed sides of a barrier layer 24. The first composite web 22 and second web 26 can each comprise fine fiber composite nonwoven webs having varied and/or similar fiber compositions. In a further aspect, the laminate can comprise a fine fiber composite nonwoven web adjacent one side of the barrier layer and a spunbond fiber web having a single fiber type. For example, the second nonwoven web 26 can comprise monocomponent spunbond fibers having an average fiber size in excess of 1.0 denier.

Figure 8:
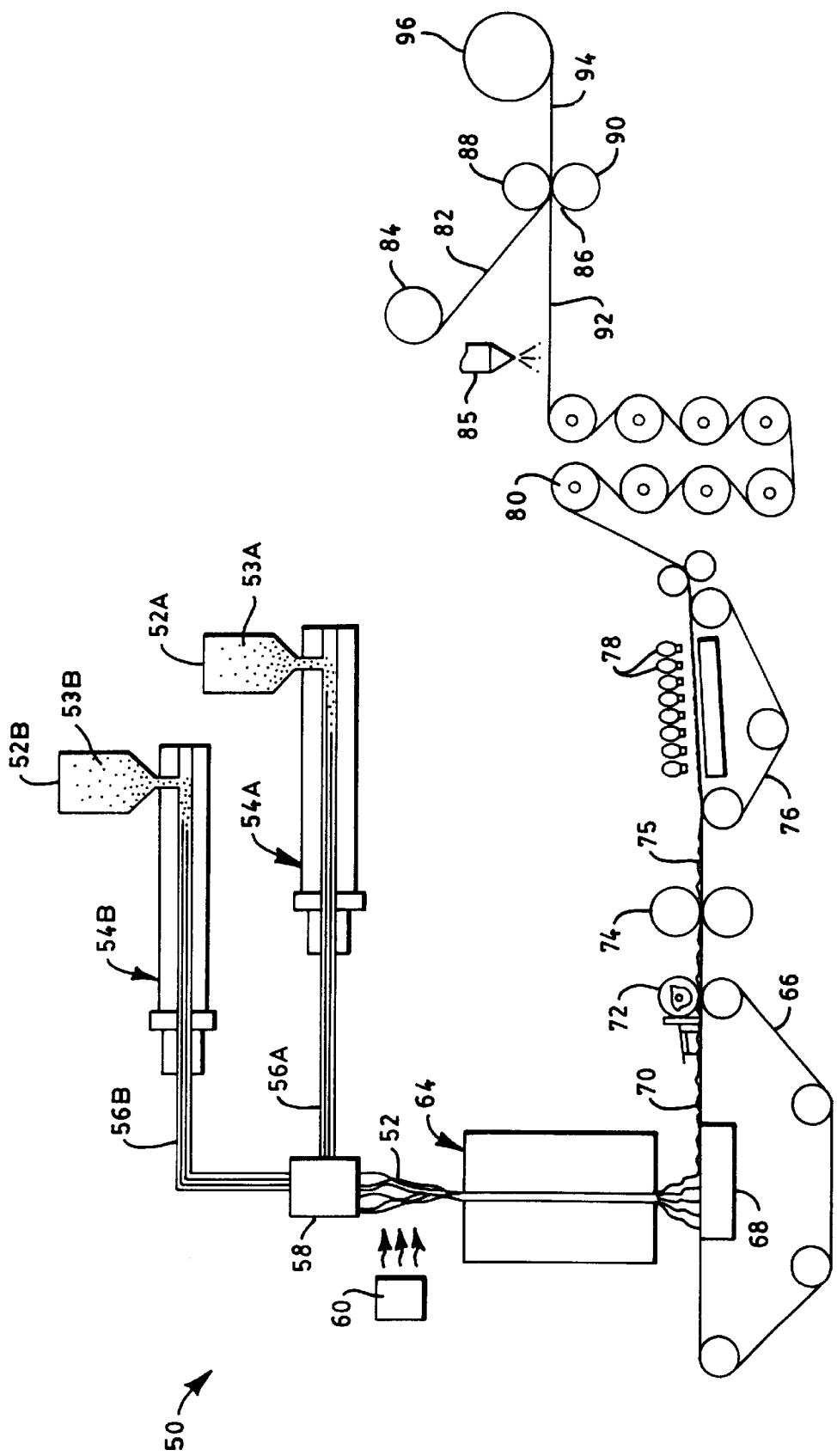
FIGS. 8–9 are schematic representation of processes for producing fine fiber composite nonwoven laminates of the present invention.

A method of making the laminate of the present invention is discussed below with reference to FIG. 8. Hoppers 52A and 52B may be filled with the respective polymeric components 53A and 53B. The polymeric components are then melted and extruded by the respective extruders 54A and 54B through polymer conduits 56A and 56B and through spin pack 58. Spin packs typically include a housing containing a plurality of distribution plates stacked one on top of the another with a pattern of openings arranged to create flow paths for directing the polymeric components as desired. The fibers are then extruded through a spinneret upon leaving spin pack 58. As the extruded filaments extend below the spinneret, a stream of air from a quench blower 60 quenches the multicomponent filaments 62. The filaments 62 are drawn into a fiber draw unit or aspirator 64 and out of the outer opening onto a traveling foraminous forming surface 66, with the aid of vacuum 68, to form an unbonded layer or substrate of multicomponent fibers 70. The unbonded multicomponent fiber substrate 70 may be lightly compressed by compression rollers 72 and then bonded, such as thermal point bonded by bonding rollers 74, thereby creating a layer or substrate of bonded multicomponent fibers 75. Bonded substrate 75 may then be hydraulically entangled, while supported on an apertured support 76, with streams of liquid from jet devices 78 in order to separate the multicomponent fiber into individual fibers. It will be appreciated that the process could be readily varied in order to treat each side of the bonded substrate web 75 in a continuous line. Various patterned apertured supports, often a wire pattern, can be selected to impart visual patterning that suggests a woven appearance. After the bonded substrate 75 has been hydraulically entangled, it can be dried by drying cans 80. A barrier fabric 82 can be unwound from a winder roll 84 and fed into nip 86, formed by nip rolls 88 and 90, in combination with the hydroentangled fabric 92. Prior to entering nip 86 and bringing the hydroentangled web 92 in contact with the barrier fabric, adhesive can be applied to desired areas of the hydroentangled nonwoven composite web via die 85. When using hot melt adhesive, the layers can be treated as necessary, such as with heated rollers 88 and 90, to activate the adhesive and form a cohesive multilayer laminate 94. Thereafter, the multilayered laminate 94 can be further processed as desired and/or would on winder roll 96.

Figure 9:
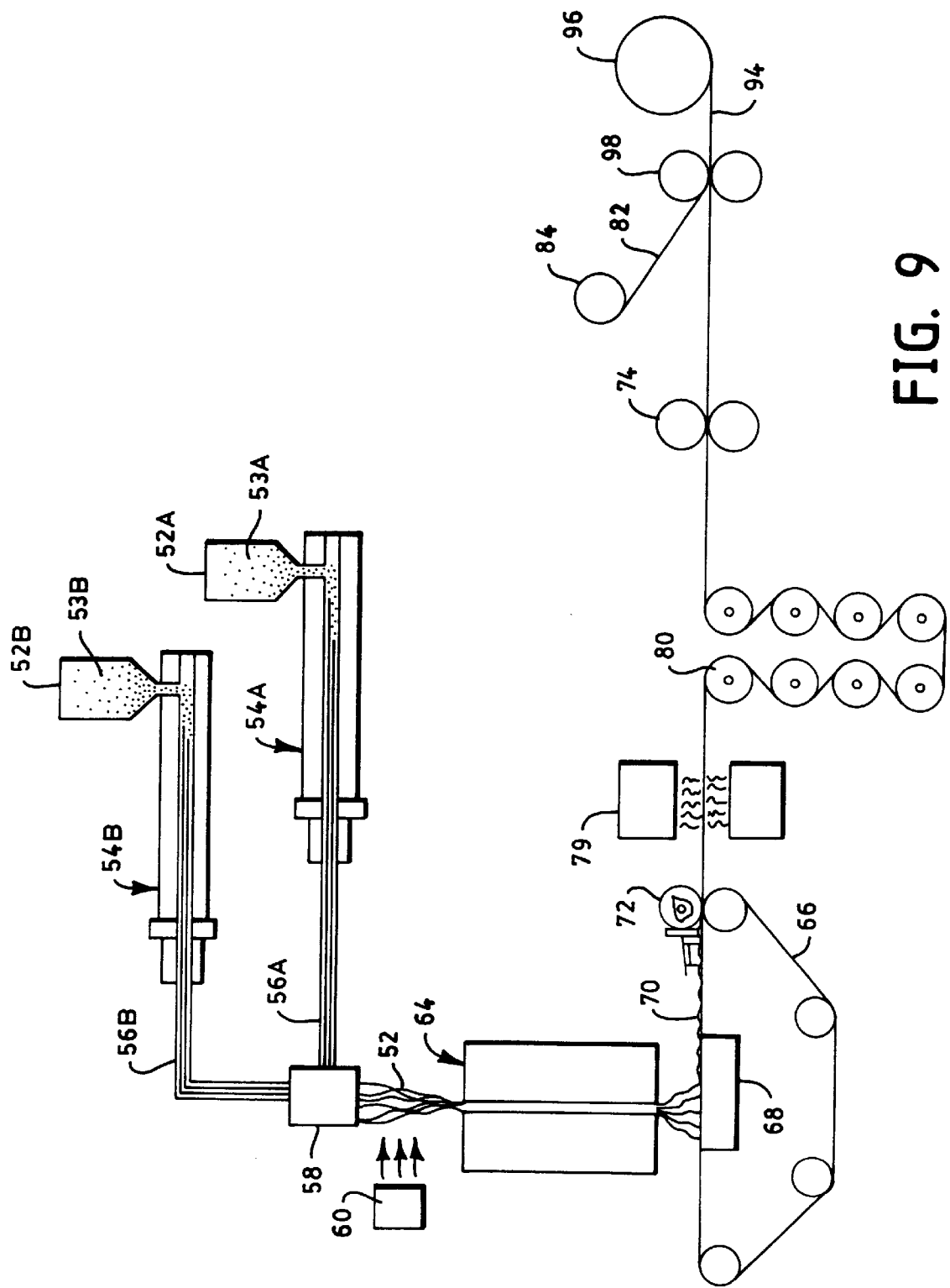

In a further aspect of the invention, the fine fiber laminate may be made in accord with the process discussed below in reference to FIG. 9. When using multicomponent fibers as disclosed in application Ser. No. 08/565,261, the unbonded multicomponent fiber substrate 70 can be treated with moisture, e.g. steam, heated water or other similar media. In reference to FIG. 9, the multicomponent spunbond fibers can be made in a manner similar to that discussed above. Spunbond fiber substrate 70 may then be treated with steamer 79 to split the multicomponent fibers and the split fiber web can then be dried by drying cans 80. The split fiber web can be bonded by bonding rolls 74 to add additional integrity to the fine fiber composite nonwoven web. In a further aspect of the invention, the split fiber web can be treated with a hot air knife or compaction rolls after fibrillating the fibers in order to provide sufficient integrity to the web for further processing. The fine fiber web can then be bonded to a barrier layer by various means in the art. In one aspect of the invention and in reference to FIG. 9, the fine fiber composite web and barrier layer can be superposed and fed through bonding rolls 98 in order to thermally point bond the layers and form multilayer laminate 94.

In a further aspect of the invention, the multicomponent fiber web can be bonded to the barrier layer and split thereafter. For example, when using multicomponent fibers as disclosed in application Ser. No. 08/565,261 the fibers exhibit latent splittability. The multicomponent fibers can be split over time by exposure to ambient conditions or can be specifically treated, such as sprayed with steam or a heated water mist, to effect splitting to form the fine fiber composite while bonded to the barrier fabric. Thus, the multicomponent fibers can be internally bonded and/or bonded to the barrier layer to form a multilayer laminate and subsequently split to form the fine fiber composite web.

The barrier laminates of the present invention may be used to either make or comprise a component of protective covers, infection control products, personal care products, garments, wipes and other articles that desirably have barrier properties. As examples thereof, the barrier laminates may be used as back sheet or an outer cover in a diaper or adult incontinence garments such as described in U.S. Pate. No. 5,415,644 to Enloe.

TESTS

Hydrohead: A measure of the liquid barrier properties of a fabric is the hydrohead test. The hydrohead test determines the height of water or amount of water pressure (in millibars) that the fabric will support before liquid passes therethrough. A fabric with a higher hydrohead reading indicates it has a greater barrier to liquid penetration than a fabric with a lower hydrohead. The hydrohead can be performed according to Federal Test Standard 191A, Method 5514. The hydrohead data cited herein was obtained using a test similar to the aforesaid Federal Test Standard except modified as noted below. The hydrohead was determined using a hydrostatic head tester available from Marlo Enterprises, Inc. of Concord, N.C. The specimen is subjected to a standardized water pressure, increased at a constant rate until the first sign of leakage appears on the surface of the fabric in three separate areas. (Leakage at the edge, adjacent clamps is ignored.) Unsupported fabrics, such as a thin film, can be supported to prevent premature rupture of the specimen.

Drape: The drape stiffness test, also sometimes called the cantilever bending test, determines the bending length of a fabric using the principle of cantilever bending of the fabric under its own weight. The bending length is a measure of the interaction between fabric weight and fabric stiffness. A 1 inch (2.54 cm) by 8 inch (20.3 cm) fabric strip is slid, at 4.75 inches per minute (12 cm/min) in a direction parallel to its long dimension so that its leading edge projects from the edge of a horizontal surface. The length of the overhang is measured when the tip of the specimen is depressed under its own weight to the point where the line joining the tip of the fabric to the edge of the platform makes a 41.5 degree angle with the horizontal. The longer the overhang the slower the specimen was to bend, indicating a stiffer fabric. The drape stiffness is calculated as 0.5×bending length. A total of 5 samples of each fabric should be taken. This procedure conforms to ASTM standard test D-1 388 except for the fabric length which is different (longer). The test equipment used is a Cantilever Bending tester model 79-10 available from Testing Machines Inc., 400 Bayview Ave., Amityville, N.Y. 11701. As in most testing, the sample should be conditioned to ASTM conditions of 65±2 percent relative humidity and 72±2 ° F. (22±1° C.), or TAPPI conditions of 50±2 percent relative humidity and 72±1.8° F. prior to testing.

Mullen Burst: This test measures the resistance of textile fabrics to bursting when subjected to hydraulic pressure. The bursting strength is defined as the hydrostatic pressure required to rupture a fabric by distending it with a force, applied through a rubber diaphragm, at right angles to the plane of the fabric. This method measures the bursting strength of products up to 0.6 mm thick, having a bursting strength between and 200 pounds per square inch. The pressure is generated by forcing a liquid (glycerin) into a chamber at the rate of 95±5 ml/min. The specimen, held between annular claims, is subjected to increasing pressure at a controlled rate until the specimen ruptures. The bursting strength is expressed in pounds. This procedure conforms to TAPPI official standard T-403 os-76, except that specimen size is 5 inches (12.6 cm) square and ten specimens are tested. The test equipment used is a motor driven Mullen bursting strength tester from B.G. Perkins & Son Inc., G.P.O. 366, Chicopee, Mass. 01021 or from Testing Machines Inc., 400 Bayview Ave., Amityville, N.Y. 11701. The sample should be conditioned to ASTM conditions of 65±2 percent relative humidity and 72±2° F. (22±1° C.), or TAPPI conditions of 50±2 percent relative humidity and 72±1.8° F. prior to testing.

Fiber tenacity: The tenacity is determined by dividing breaking load in grams by denier and is a measure of the strength of the fiber per cross sectional area.

Grab Tensile test: The grab tensile test is a measure of breaking strength and elongation or strain of a fabric when subjected to unidirectional stress. This test is known in the art and conforms to the specifications of Method 5100 of the Federal Test Methods Standard 191A. The results are expressed in pounds or grams to break and percent stretch before breakage. Higher numbers indicate a stronger, more stretchable fabric. The term "load" means the maximum load or force, expressed in units of weight, required to break or rupture the specimen in a tensile test. The term "total energy" means the total energy under a load versus elongation curve as expressed in weight-length units. The term "elongation" means the increase in length of a specimen during a tensile test. The grab tensile test uses two clamps, each having two jaws with each jaw having a facing in contact with the sample. The clamps hold the material in the same plane, usually vertically, separated by 3 inches (76 mm) and move apart at a specified rate of extension. Values for grab tensile strength and grab elongation are obtained using a sample size of 4 inches (102 mm) by 6 inches (152 mm), with a jaw facing size of 1 inch (25 mm) by 1 inch, and a constant rate of extension of 300 mm/min. The sample is wider than the clamp jaws to give results representative of effective strength of fibers in the clamped width combined with additional strength contributed by adjacent fibers in the fabric. The specimen is clamped in, for example, a Sintech 2 tester, available from the Sintech Corporation, 1001 Sheldon Dr., Cary, N.C. 27513, an Instron Model TM, available from the Instron Corporation, 2500 Washington St., Canton, Mass. 02021, or a Thwing-Albert Model INTELLECT II available from the Thwing-Albert Instrument Co., 10960 Dutton Rd., Phila., Pa. 19154. This closely simulates fabric stress conditions in actual use. Results are reported as an average of three specimens and may be performed with the specimen in the cross direction (CD) or the machine direction (MD).

EXAMPLE 1

Multicomponent 6 denier spunbond fibers (about 750 $\mu^2$ cross-sectional area) were produced comprising 16 pie shaped segments of alternating polymeric components of PETG (KODAR® PETG copolyester 6763 from Eastman Chemical Co. and HDPE (a 0.955 g/cc ethylene polymer available from Dow Chemical Co. available under the designation Dow 25355 polymer). The fibers were drawn and deposited upon a foraminous forming belt and slightly compacted. The compacted web of multicomponent spunbond fibers was then thermally point bonded using two heated patterned steel rolls. Each roll was heated to 210° F. and was spirally grooved with the orientation of the spirals of each roll being oppositely oriented. The patterned rolls create a discrete pattern of square bond points having 0.17 cm×0.17 cm dimensions and edge spacings between bond points of 0.46 cm. The patterned rolls create a total bond area of about 8% of the fabric total surface area. The bonded spunbond web of multicomponent fibers had a basis weight of 34 g/m² and was then transferred to a 100 mesh forming wire that carried the fabric under three manifolds. Each manifold contained a linear array of 0.15 mm diameter holes at a density of 16 holes/cm. High pressure water at ambient temperature was pumped through the holes in the manifolds directed towards, the bonded spunbond fabric on the forming wire. The energy-impact of the water jets was 11.9 mega-Joule-Newton/Kg. Energy Impact is discussed in greater detail in U.S. Pat. No. 5,023,130 to Simpson et al. The impact of the water caused separation of the fibers into the individual segments and which resulted in a fine fiber composite web.

A monolithic polyolefin cast film consisting of 45% LLDPE (Dowlex® NG 3310, 0.918 g/cc density from Dow Chemical Co.), 5% LDPE (Dow 4012, 0.916 g/cc density from Dow Chemical Co.) and 50% Supercoat™ (a ground stearic acid coated $CaCO_3$ available from English China Clay), and was stretched in the machine direction to yield a microporous film having a basis weight of about 20 $g/M^2$ and a MVTR of about 1000 $glm^2/24$ hours.

A 5 $g/m^2$ meltblown layer of diaper construction adhesive (type 5610 from H.B. Fuller Co.) was sprayed onto one side of the fine fiber composite web which was then immediately applied against the microporous film by passing the layers through an unheated nip formed by a smooth steel and a rubber roll.

The resulting laminate had the following physical properties:

| | |
|---|---|
| Basis Weight | 60 |
| Mullen Burst | 21 |
| Grab Tensile Peak Load: | |
| Machine direction | 5161 gms |
| Cross direction | 1279 gms |
| Grab Tensile Peak Elongation: | |
| Machine direction | 50 |
| Cross direction | 62 |

EXAMPLE 2

Multicomponent spunbond filaments were produced comprising 16 pie shaped segments of alternating polymeric components of PET (polyethylene terephthalate of 0.72 Intrinsic Viscosity from Hoechst Celanese) and a linear low density polyethylene (Dow Chemical's ASPUN 6811A). The fibers were drawn, formed into a web, and bonded as described in Example 1; the bond pattern used consisted of square pins, each pin having a side dimension of 0.94 mm, uniformly spaced about 2.5 mm apart as described in U.S. Pat. No. 3,855,046 to Hansen et al. The bonded fabric was subsequently hydroentangled as described in Example 1 to split the polymeric components, between the bond points, into individual fibers and to impart a cloth-like visual appearance. The final fabric basis weight was 95 $m^2$.

The film used as the barrier layer was a cast coextruded "AB" film having a base layer ("B") comprising 45% LLDPE (Dowlex® NG 3310, 0.918 g/cc density from Dow Chemical Co.), 5% LDPE 9Dow 4012, 0.916 g/cc density from Dow Chemical Co.) and 50% Supercoatim (a ground stearic acid coated $CaCO_3$ available from English China Clay), and a bonding layer ("A") comprising 60% Supercoat™ $CaCO_3$, 20% amorphous propene-rich polyalphaolefin (Huls Vestoplast® 0.865 g/cc density from Huls America, Inc.) and 20% elastomeric polyethylene (Dow Affinity® EG 8200, 0.87 g/cc density from Dow Chemical Co.). The base layer constituted 90% by weight and the bonding layer 10% by weight of the total weight of the AB film. The film was stretched in the machine direction to about 20 $g/m^2$ which yielded a microporous film having a MVTR of about 425 $g/m^2/24$ hours.

The fine fiber composite web and the microporous film, with the bonding layer facing the towards the fine fiber composite web, were brought together and then thermally point bonded. The film and fine fiber composite web were fed through a heated nip maintained at about 200° F. that was formed by a smooth steel roll and a patterned steel patterned roll. The resulting bond points where about 1.5 mm in diameter orthogonally spaced about 4 mm apart.

While various patents and other reference materials have been incorporated herein by reference, to the extent there is any inconsistency between incorporated material and that of the written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

We claim:

1. A barrier laminate comprising:
 a fine fiber composite nonwoven web comprising a mixture of first and second continuous fibers disposed throughout said web, said first fibers having a fiber size less than 1.0 denier and wherein said first spunbond fibers comprise a first polymer and said second spunbond fibers comprise a second polymer immiscible with said first polymer; and
 a barrier layer having a hydrohead of at least 30 mbar, wherein said barrier layer and said fine fiber nonwoven web are bonded to form a multilayer laminate.

2. The barrier laminate of claim 1 wherein said fine fiber composite comprises a hydroentangled web.

3. The barrier laminate of claim 1 wherein said barrier layer is a. microporous film and has a hydrohead in excess of 50 mbar.

4. The barrier laminate of claim 3 wherein said barrier layer is a microporous film comprising a polyolefin and a filler wherein the xmicroporous film has a basis weight of less than about 35 $g/m^2$.

5. The barrier laminate of claim 2 wherein said barrier layer comprises a microporous film.

6. The barrier laminate of claim 2 wherein said first polymer comprises polyethylene terephthalate and said second polymer comprises polyethylene.

7. The barrier laminate of claim 1 wherein said first polymer comprises an amide polymer and said second polymer comprises an ethylene polymer.

8. The barrier laminate of claim 2 wherein said first polymer comprises polyethylene terephthalate and the second polymer comprises polyethylene.

9. The laminate of claim 1 wherein said first and second fibers of the fine fiber composite have an average fiber diameter less than about 0.025 and about 0.9 denier.

10. The laminate of claim 9 wherein said fine fiber composite web is thermally bonded to said barrier layer.

11. The laminate of claim 1 wherein said barrier layer comprises a meltblown fiber web having a basis weight of at least about 10 $g/m^2$.

12. The laminate of claim 11 wherein said meltblown comprises a polyolefin polymer.

13. The laminate of claim 12 wherein the second polymer of said fine fiber composite comprises a polyolefin polymer miscible with said polyolefin polymer of said meltblown fiber web.

14. The laminate of claim 13 wherein said second polymer of said fine fiber composite comprises an ethylene polymer.

15. The laminate of claim 12 wherein the first and second fibers of said fine fiber composite have a fiber denier between about 0.025 and about 0.9.

16. The laminate of claim 15 wherein the first fibers of said fine fiber composite have a fiber size between about 0.025 and 0.5 denier.

17. The laminate of claim 1 wherein said barrier layer comprises a microporous film and wherein said first and second spunbond fibers each have a fiber denier of less than 0.9.

18. The laminate of claim 17 wherein said first spunbonded fibers have an average fiber size less than about 0.5 denier.

19. The laminate of claim 17 wherein said microporous film comprises a polyolefin film.

20. The laminate of claim 19 wherein said microporous film comprises an ethylene polymer and $CaCO_3$ filler particles.

21. The laminate of claim 20 wherein the second fibers of said web of spunbonded fibers comprise polyethylene.

22. The laminate of claim 1 wherein the fine fiber composite web is bonded to the first side of said barrier layer and a second nonwoven web is bonded to the second side of said barrier layer.

23. The laminate of claim 22 wherein said barrier layer comprises a meltblown fiber web and wherein said second nonwoven layer comprises a spunbond fiber web.

24. The laminate of claim 23 wherein the first and second fibers of said fine fiber composite have a fiber denier between about 0.025 and about 0.9 and wherein said nonwoven web comprises a spunbond fiber web having a fiber size in excess of 1.0 denier.

25. The laminate of claim 24 wherein said spunbond web having a fiber size in excess of 1.0 denier comprises a monocomponent web.

26. The barrier laminate of claim 23 wherein said first polymer comprises nylon and said second polymer comprises polyethylene.

27. The barrier laminate of claim 23 wherein said first polymer comprises polyethylene terephthalate and the second polymer comprises polyethylene.

28. The laminate of claim 22 wherein said barrier layer comprises a polyolefin film and wherein said second nonwoven layer comprises a spunbond web.

29. The laminate of claim 28 wherein the first and second fibers of said fine fiber composite have a fiber denier between about 0.025 and about 0.5 and wherein said nonwoven web comprises a spunbond fiber web having a fiber size in excess of 1.0 denier.

30. The laminate of claim 29 wherein said spunbond web comprises a monocomponent web.

31. The barrier laminate of claim 29 wherein said first polymer comprises nylon and said second polymer comprises polyethylene.

32. The barrier laminate of claim 29 wherein said first polymer comprises polyethylene terephthalate and the second polymer comprises polyethylene.

* * * * *